(12) United States Patent  (10) Patent No.: US 8,413,630 B2
Herzog et al.  (45) Date of Patent: Apr. 9, 2013

(54) BALANCING SHAFT

(75) Inventors: Ewald Herzog, Mahlstetten (DE);
Raphael Herzog, Mahlstetten (DE)

(73) Assignee: Herzog Intertec GmbH, Mahlstetten (DE)

( * ) Notice: Subject to any disclaimer, the term of this patent is extended or adjusted under 35 U.S.C. 154(b) by 0 days.

(21) Appl. No.: 12/452,066

(22) PCT Filed: May 29, 2008

(86) PCT No.: PCT/EP2008/004284
§ 371 (c)(1),
(2), (4) Date: Dec. 14, 2009

(87) PCT Pub. No.: WO2008/151724
PCT Pub. Date: Dec. 18, 2008

(65) Prior Publication Data
US 2010/0132652 A1  Jun. 3, 2010

(30) Foreign Application Priority Data
Jun. 14, 2007 (DE) .......... 10 2007 027 989

(51) Int. Cl.
*F02B 75/06* (2006.01)
*F16C 3/04* (2006.01)
*G05G 3/00* (2006.01)
(52) U.S. Cl. .................. 123/192.2; 123/90.21; 74/603; 74/591
(58) Field of Classification Search ............... 123/192.2, 123/90.21; 74/603, 591
See application file for complete search history.

(56) References Cited

U.S. PATENT DOCUMENTS

| 1,749,807 | A | * | 3/1930 | Henry Ford .......... 74/603 |
| 2,838,957 | A | | 6/1958 | Johnson |
| 3,673,651 | A | * | 7/1972 | Stewart ............ 29/888.08 |
| 3,748,925 | A | * | 7/1973 | Stewart ............... 74/603 |
| 4,028,963 | A | * | 6/1977 | Nakamura et al. ...... 74/604 |

(Continued)

FOREIGN PATENT DOCUMENTS
DE  198 35 145 A1  2/2000
DE  101 15 536 A1  10/2001
(Continued)

OTHER PUBLICATIONS

JP 58039830; Tsunehiko, Suzuki; Aug. 3, 1893, Translation.*

(Continued)

*Primary Examiner* — Rinaldi Rada
*Assistant Examiner* — Tea Bajramovic
(74) *Attorney, Agent, or Firm* — Kriegsman & Kriegsman

(57) ABSTRACT

The invention relates to a balancing shaft for a single-cylinder or multi-cylinder engine having at least one unbalanced weight portion (21, 22; 23, 24) and at least one bearing (16, 17), the at least one unbalanced weight portion (21, 22; 23, 24) being associated with the bearing (16, 17) and the bearing (16, 17) having a radial running face (18) which extends only partially over a periphery of the bearing (16, 17) and a centrifugal force which results during rotation of the balancing shaft (11) is situated within a region of the bearing (16, 17) that is formed by the running face (18) which extends partially over the periphery of the bearing (16, 17), wherein provision is made for at least one supporting surface (51) to extend partially over the periphery of the bearing (16, 17) and to be provided separate from the running surface (18).

20 Claims, 5 Drawing Sheets

U.S. PATENT DOCUMENTS

| | | | |
|---|---|---|---|
| 4,617,885 A * | 10/1986 | Oshiro et al. | 123/192.2 |
| 5,293,684 A * | 3/1994 | Fry | 29/888.08 |
| 5,791,309 A * | 8/1998 | Yamazaki et al. | 123/192.2 |
| 6,405,702 B2 * | 6/2002 | Takano et al. | 123/192.2 |
| 6,581,495 B2 * | 6/2003 | Cagney et al. | 74/603 |
| 6,626,063 B2 * | 9/2003 | Killion | 74/603 |
| 6,659,060 B2 * | 12/2003 | Linder et al. | 123/192.2 |
| 6,708,663 B1 * | 3/2004 | Stuckler | 123/192.2 |
| 6,732,694 B2 * | 5/2004 | Holweg | 123/179.25 |
| 6,854,358 B1 * | 2/2005 | Stuckler | 74/603 |
| 6,971,361 B2 * | 12/2005 | Lawrence | 123/192.2 |
| 7,444,976 B2 * | 11/2008 | Hofheinz et al. | 123/192.2 |
| 7,506,628 B2 * | 3/2009 | Marzy et al. | 123/192.2 |
| 7,617,810 B1 * | 11/2009 | Phillips et al. | 123/192.2 |
| 7,628,133 B2 | 12/2009 | Tisch et al. | |
| 2001/0029919 A1 * | 10/2001 | Cagney et al. | 123/192.2 |
| 2002/0017263 A1 * | 2/2002 | Linder et al. | 123/192.2 |
| 2004/0079316 A1 * | 4/2004 | Lawrence | 123/192.2 |
| 2005/0284254 A1 * | 12/2005 | Hawkins et al. | 74/603 |
| 2009/0308343 A1 | 12/2009 | Herzog et al. | |
| 2010/0192894 A1 | 8/2010 | Herzog et al. | |

FOREIGN PATENT DOCUMENTS

| | | | |
|---|---|---|---|
| DE | 102 57 562 A1 | 7/2004 | |
| DE | 103 47 348 A1 | 5/2005 | |
| EP | 0 753 678 A2 | 1/1997 | |
| EP | 0 789 166 A1 | 8/1997 | |
| EP | 1 081 410 A1 | 3/2001 | |
| EP | 1 775 484 A2 | 4/2007 | |
| EP | 2 014 935 A1 | 1/2009 | |
| EP | 2 017 486 A1 | 1/2009 | |
| FR | 2 823 279 A | 10/2002 | |
| JP | 54139936 U | 9/1979 | |
| JP | 56056947 A | 5/1981 | |
| JP | 58039830 A | 3/1983 | |
| JP | 07217638 A | 8/1995 | |
| JP | 09151993 A * | 6/1997 | |
| JP | 2001074105 A | 3/2001 | |
| JP | 2001140985 A | 5/2001 | |
| JP | 2003035349 A | 2/2003 | |
| JP | 2005016644 A | 1/2005 | |
| JP | 2006002852 A | 1/2006 | |
| JP | 2009210134 A | 9/2009 | |
| WO | 2005093286 A1 | 10/2005 | |

OTHER PUBLICATIONS

ATZ Online website, www.atzonline.de, dated Jan. 13, 2004.
FEV-Spectrum Technologie Highlights aus dem FEV Arbeitsspektrum, Ausgabe Apr. 23, 2003.
Reibleistungsreduktion aus MTZ Jul.-Aug. 2005 (Reduction of Friction Power disclosed in MTZ Jul.-Aug. 2005).
English translation of the relevant portion of an Office Action dated Jul. 24, 2012, in Japanese Patent Application No. 2010-511517.
English translation of the relevant portion of an Office Action dated Oct. 2, 2012, in Japanese Patent Application No. 2010-511516.

* cited by examiner

BALANCING SHAFT

The invention relates to a balancing shaft for a single-cylinder or a multi-cylinder engine as claimed in the pre-characterizing clause of claim 1.

WO 2005/093286 A1 discloses a balancing shaft for a multi-cylinder engine comprising at least two unbalanced weight portions and at least one bearing, the unbalanced weight portions being arranged symmetrically to the bearing and at least one of the unbalanced weight portions having an end which is remote from the bearing as an end which can be driven for the balancing shaft. A resiliently flexible coupling element is provided between the two bearings with their unbalanced weight portions arranged symmetrically thereto in order to join the two portions together. The unbalanced weight portions are roughly semicircular in their configuration. The bearings are provided as circular cylindrical disks, one half of the cylindrically configured bearing protruding freely relative to the unbalanced weight portions. T-shaped struts, which extend in the longitudinal direction of the balancing shaft and from an axis of rotation, acting on the unbalance, up to a free outer edge region of the cylindrical bearing, are provided to reinforce this balancing shaft. This is intended to reinforce the balancing shaft in the longitudinal direction. Some such balancing shafts are weight-optimized in their configuration; however, owing to the ever higher rotational speeds in multi-cylinder engines, there is a need further to reduce the moved masses. Furthermore, the saving of weight in the development of the engine is of fundamental importance in order to achieve improved performance values.

The invention is therefore based on the object of providing a balancing shaft in which the overall weight and the moved masses are reduced while maintaining the compensation for unbalance in multi-cylinder engines.

According to the invention, this object is achieved by the features of claim 1. Further advantageous configurations and developments are disclosed in the further dependent claims.

The balancing shaft according to the invention having a bearing having a radial running face extending only partially over the periphery of the bearing, and thus not over a periphery of 360°, allows a considerable reduction in weight at the bearing itself. The bearing is thus cut free in partial regions and displays a reduction in material at least in the free space not formed by the running face. In addition to the reduction in weight of the bearing itself, the cutting-free of the bearing has the advantage of allowing one or more unbalanced weight portions also to be reduced. The running face extending partially over the periphery of the bearing corresponds to the peripheral portion of the balancing shaft, in which the unbalanced weight portions are provided. This allows, on rotation of the balancing shaft, the resulting centrifugal force to lie in a region of the bearing that is also encompassed by the partial running face, so that the running face of the balancing shaft is supported in this region at the bearing of the engine unit. This saves weight while maintaining the functioning of the balancing shaft, which lies in a range of between 20 and 40% relative to a conventional balancing shaft. The at least one supporting surface, which is essentially situated opposite the running face, permits to achieve an increased smoothness of running whilst at the same time saving weight. In particular in the occurrence of shocks or vibrations and also when a rotation starts or ends, the at least one supporting surface has the important function of ensuring a smooth running of the balancing shaft.

This configuration according to the invention of the running face, which is formed partially over the periphery of the bearing, and the at least one supporting surface opposite the running face has the further advantage of preserving a mounting having a long service life. In the region in which the resulting centrifugal force acts during rotation of the balancing shaft, the running face is complete in its configuration and extends adjacent thereto, so that in the region of the greatest loading, the bearing rests against a bearing bush, against rollers of a needle bush, against a cylindrical roller bearing or against a bearing ring of the engine unit for mounting in a manner defined relative to the supporting. The load on the region of the bearing that opposes the greatest loads and is provided with a running face only in part or not at all is almost or completely relieved, so that the absence of the running face in this region does not have an adverse effect on the bearing function. The at least one supporting surface is used to assist in particular in the beginning and at the end of a rotational movement.

According to a preferred configuration of the invention, provision is made for the at least one supporting surface to have the same outer periphery as the partially formed running face of the bearing. This may allow counter-bearing or supporting of the running face. At the same time, a great amount of weight saving may be preserved.

The centrifugal force acting on the running face while the balancing shaft is in rotation is preferably opposed by a resultant force which results from the at least one supporting surface. A balancing shaft formed in accordance therewith allows a versatile configuration of the at least one running face and the at least one supporting surface, so that they may be adapted to different applications while still preserving smoothness of running, a long service life, and savings in weight.

Furthermore, provision is preferably made for the running face of the at least one bearing to have a peripheral angle formed to be equal to, or smaller than 180°. A configuration of this type makes it possible, in particular, to achieve an important saving in weight, since also the unbalanced weight portions adjoining the at least one bearing may be realized in a reduced manner.

According to an advantageous configuration of the invention, provision is made for the running face of the bearing to have a peripheral angle of between 180° and 359° and advantageously to extend continuously within this peripheral angle. The configuration of the merely partially formed running face of at least 180° ensures that, in the event of the balancing shaft stopping overhead, i.e. the unbalanced weight portions being oriented vertically upward, a round approach is facilitated without catching. The end regions of the running face, which extend beyond 180°, assume a supporting function in a stop-page position of this type. Even in the case of a very small free space of the partially formed running face of for example 1°, it is possible to allow a region extending toward the axis of rotation to be cut free in order to reduce weight and for merely the running faces to be provided as half-shell or shell-like circular segment portions for the purpose of guidance.

According to a further advantageous configuration of the invention, provision is made for a depression to be formed between the at least one supporting surface and the running face of the bearing. This makes it possible to form defined connections between the running face and the at least one supporting surface, which may be provided for forming a rigid cross-section and also for forming what is known as lubrication bore reliefs.

According to a further advantageous configuration of the invention, provision is made for the running face or the at least one supporting surface to be spherical in their configuration, viewed in the axial direction. This allows bending stresses occurring during operation between the bearings and tilting or toppling to be accommodated without damage to the bearing, such as for example a bearing bush, a bearing ring, needle rollers or cylindrical rollers. Alternatively the running surface and the supporting surface can be spherical in its configuration.

The bearing of the balancing shaft comprises, viewed in cross section to the longitudinal direction thereof, a depression which is for example configured in a V-shaped, W-shaped, tub-shaped or cup-shaped manner. Depressions of this type can be formed immediately during the manufacture of the balancing shaft by casting, forging, pressing or the like and also by machining, thus allowing economical manufacture of bearings of this type while at the same time saving weight.

Preferably, provision is made for the at least one depression in the bearing to be configured symmetrically to the longitudinal direction of the balancing shaft. This allows the balancing shaft to be developed in a simple manner in terms of design and in particular the configuration of the unbalanced weight portions. The at least one depression may be provided between the running face and the supporting surface. If required, a depression may also be formed between two running face portions.

According to an alternative configuration of the depression, provision is made for said depression to form, together with the running face of the bearing extending only partly over the periphery, a cross-sectional surface in which the axis of rotation lies in the cross section of the bearing. This embodiment has the advantage of allowing the balancing shaft to be reinforced and the balancing shaft thus to be used for particular loads. In such a case, the somewhat reduced saving in weight is of secondary importance.

According to an alternative configuration of the invention, provision is made for the depression in the bearing to have, viewed in cross section, at least one central portion situated in the axis of rotation of the balancing shaft. This allows the axis of rotation to be reinforced, wherein at least one further depression portion can be configured adjacent to the central portion in order to save weight.

A further alternative configuration of the bearing provides for the running face and the at least one supporting surface of the bearing and the depression adjoining it to form a cross-sectional surface in which the axis of rotation lies outside the cross-sectional surface. A crescent-shaped cross section of the bearing can for example be achieved in this way. A cross section of this type has the advantage that said cross section at the same time acts and can be used as a scoop for the lubricating liquid.

A further alternative embodiment of the bearing provides for a depression to form with the running face extending partially over the periphery of the bearing a turbine wheel-like or an asymmetrical cross section. This greatly favors the conveyance of the lubricating liquid.

A further advantageous configuration of the bearing for the balancing shaft provides for the running faces extending partially over the periphery to be configured symmetrically to the resulting centrifugal force on rotation of the balancing shaft. As a result, the bearings themselves act as unbalanced weight portions and can be included in the calculation thereof for the design of the balancing shaft.

Furthermore, provision is advantageously made for the running-face width of the running face or supporting surface, extending partially over the periphery, of the bearing to taper, at least in certain portions, to the end portions of the running face. In other words, this means that the running face has in the region of action of the resulting centrifugal force a greatest width or extent in the longitudinal direction of the axis of the balancing shaft and tapers, at least in certain portions, in and counter to the clockwise direction to the free end portions of the running face in the width thereof. An additional saving in weight and reduction in bearing friction can be achieved as a result. The width of the running face can also change a plurality of times along the peripheral angle, thus providing tapering and widening in alternation. The same is true, by analogy, of the supporting surface. The taper may be provided at the same time both on the running face and on the supporting surface.

The peripheral angle of the running face or supporting surface of the first bearing is, according to an advantageous configuration of the invention, equal to the peripheral angle of the running face of the at least one further bearing. This provides the same bearing conditions at each bearing.

Furthermore, provision is preferably made for the first and at least one further running face or supporting surface of the at least one further bearing to be of the same orientation, viewed in the longitudinal direction of the axis of the balancing shaft, with respect to the peripheral angle thereof. A balancing shaft for the static unbalance in the engine housing can in particular be provided in this way. At the same time, this also allows a substantially mirror-symmetrical arrangement relative to the center plane of the balancing shaft.

According to an alternative configuration of the invention, provision is made for the running faces of the bearings to be provided rotated relative to one another in the longitudinal direction of the axis. This allows what is known as an unbalance of moments to be compensated for. Balancing shafts of this type are used in particular in engines having a V-shaped cylinder arrangement or an odd number of cylinders. For example, in a balancing shaft having two bearings, the running faces of these bearings can be provided rotated through 180° relative to one another. If more than two bearings are provided, the orientation of the running surfaces is adapted to the unbalance of moments to be achieved and arranged offset or rotated relative to one another in the radial direction of action, in accordance with the center plane of the balancing shaft, so that the corresponding unbalances of moments can be generated. In accordance with this arrangement, the supporting surfaces are associated with the running surface of each bearing.

Preferably, for a balancing shaft, provision is made, for the unbalance of moments, for said balancing shaft to be configured substantially point-symmetrically to the center plane. This allows defined forces to act, in accordance with the respective lever arm, relative to the center plane, thus allowing the unbalance of moments to be adapted precisely to the forces to be counteracted.

According to a further preferred configuration, provision is made, in the case of at least two running faces, arranged relative to one another mutually rotated about the X axis or longitudinal axis of the balancing shaft, of the bearing, for an overlap region of the running faces to be provided. The end regions of the running face are preferably slightly superimposed on one another, viewed in a direction along the longitudinal axis. This allows low-loss mounting to be provided.

According to a further preferred configuration of the invention, provision is made for at least one unbalanced weight portion to have an outer peripheral portion having a larger diameter than that of the at least one running face of the bearing. Such unbalanced portions protruding beyond the outer periphery of the running face are provided preferably on an outer end portion of the balancing shaft, so that simple mounting is preserved. Balancing shafts of this type also serve to compensate for the unbalance of moments.

According to a preferred configuration, the balancing shaft has at least one bearing as well as a fixed bearing. This allows to provide a defined mounting of the balancing shaft, which may be used in particular within an engine housing. As an alternative, two bearings may be provided in order to enable a mounting of the balancing shaft.

The object on which the invention is based is achieved according to the invention by a balancing shaft for a single-cylinder or a multi-cylinder engine which has at least one unbalanced weight portion and at least one bearing, with at least one unbalanced weight portion being associated with the bearing and the bearing having a radial running face which extends only partially over a periphery of the bearing and a centrifugal force which results from rotation of the balancing shaft lying in a region of the bearing that is formed by the running faces extending partially about the periphery of the bearing, the partial running face of the bearing comprising a peripheral angle of less than 180°. This embodiment allows a considerable saving in weight whilst preserving the functions of the balancing shaft. A running surface of this type, which is reduced in its configuration, allows to equally reduce the unbalanced weight portions. A preferred embodiment of this type is provided, in particular, in smaller single-cylinder or multi-cylinder engines. A balancing shaft of this type may comprise advantageous embodiments according to the claims mentioned hereinbefore, with the exception of claims 4 and 5.

The invention and further advantageous embodiments and developments thereof will be described and explained in greater detail hereinafter based on the examples illustrated in the drawing. According to the invention, the features which may be inferred from the description and the drawings can be applied each individually or jointly in any desired combination. In the drawings:

FIG. 3b is a schematic sectional view of an alternative cross-section differing from that in FIG. 3a;

Figure 1:
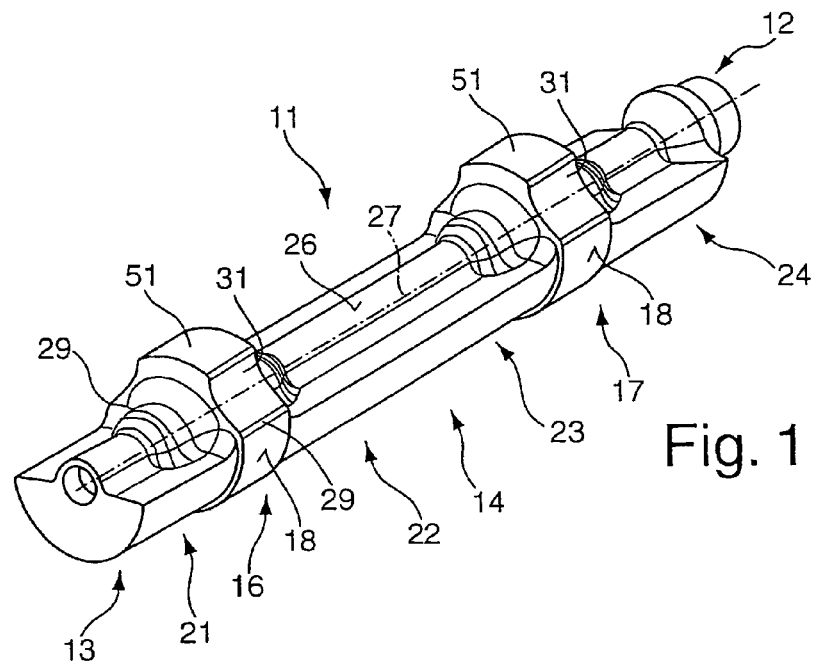
FIG. 1 is a perspective view of a first embodiment according to the invention of a balancing shaft.

FIG. 1 is a perspective view of a first embodiment of the balancing shaft 11 according to the invention. A balancing shaft 11 of this type is provided for a multi-cylinder engine and serves to compensate for second-order mass forces. Conventionally, two balancing shafts, which then rotate in opposite directions at double engine speed, are arranged offset relative to each other.

A drive (not shown in greater detail), such as for example a chain wheel which drives the balancing shaft 11, is provided at a trailing end portion 12, shown in FIG. 1, of the balancing shaft. The balancing shaft 11 comprises a basic element 14 on which the first and second bearing 16, 17 are provided. Said bearings serve to mount the balancing shaft 11 in an engine unit. These bearings 16, 17 have a running face 18, the periphery of which is configured so as to be larger than a periphery of the remaining portions of the basic element 14. This allows the balancing shaft 11 to be inserted into the bearings or bearing bushes in the engine unit, with one end portion 13 in front.

The basic element 14 as viewed in the longitudinal direction of the balancing shaft 11 has essentially a constant cross-section along its entire length. In symmetrical disposition with respect to the first and second bearings 16, 17, unbalanced weight portions 21 to 24 are arranged, the unbalanced weight portions 22 and 23 merging with each other seamlessly. The end portions 12 and 13 are taken into account in the dimensioning of said unbalanced weight portions. The basic element 14 has a wall portion 26 which passes through an axis of rotation 27 of the balancing shaft 11 or lies in this axis of rotation 27.

The first and second bearings 16, 17 have a running face 18 extending partially over the periphery of a bearing 16, 17, said running face 18 encompassing only part of the periphery. Said periphery may be configured to be equal to, greater or smaller than 180°. This configuration forms what is known as a partial bearing. In the exemplary embodiment according to FIG. 3a, the peripheral angle of the running face lies for example in a range of between 180° and 220°. In the further region, which would be provided for a 360° angle for the sake of completeness, at least one supporting surface 51 is provided according to the invention which, however, does not close the free region formed by the running face. The first and second bearings 16, 17 according to the invention illustrated in FIGS. 1 to 3 allow a bearing 16, 17 to be configured with a considerable saving in weight as compared to circular cylindrical or disk-like bearings known in the art. At the same time, it can be ensured by way of the end regions 29 protruding therebeyond over an angle of wrap of 180° that a simple approach of a stationary balancing shaft 11 in a bearing in the engine unit is enabled and that, in particular if the balancing shaft stops in a position in which the unbalanced weight portions 21 to 24 point vertically upward, a secure approach is facilitated without tilting.

Figure 3A:
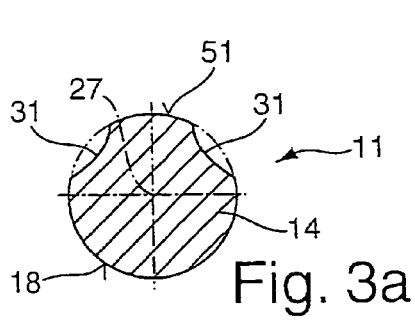
FIG. 3a is a schematic sectional view along the line III-III in FIG. 2.

The bearing 16, 17 has, viewed in the cross section according to FIG. 3, two depressions 31 which are cup-shaped or tub-shaped in their configuration. These depressions 31 may be configured in the form of pockets which are only slightly recessed relative to the outer periphery. These depressions 31 may equally be configured so as to form an strong reduction in cross-section in the bearing 16, 17. The depressions 31 may, for example, be configured so as to be symmetrically arranged with respect to the supporting surface 51 and of equal size. Such depressions 31 may also be unequally configured with respect to each other and may not be disposed symmetrically relative to the supporting surface 51. In the exemplary embodiment according to FIG. 3a, the running face 18 encompasses a peripheral angle of equal to, or greater than 180°. Only one supporting surface 51 is formed. The cross-sectional arrangement represented in FIG. 3a allows to form a more rigid configuration of the bearing 16, 17.

The centrifugal force resulting on rotation of the balancing shaft points in the exemplary embodiment, owing to the illustrated position of the balancing shaft 11, perpendicularly downward in the direction indicated by arrow $F_z$ in FIG. 3. Provided symmetrically thereto are the running face portions for forming the partial running faces 18 extending in and counter to the clockwise direction. Ideally, the symmetrical arrangement, illustrated in FIG. 3, of a left and right running face portion is provided to form the entire partial running face 18 in relation to the orientation of the resulting centrifugal force. Alternatively, the resulting centrifugal force can also comprise an orientation, such as for example in the 4 or 5 o'clock, and also 7 or 8 o'clock position or the like. The supporting force resulting from the supporting surface 51 is preferably opposed to the centrifugal force defined by the running face in order to achieve good running characteristics. In particular, the supporting surfaces 51 have the advantage that, in the event of the balancing shaft stopping overhead, the supporting surface 51, as the deepest point within an engine housing, represents the bearing surface of the balancing shaft 11 when in a rest position.

Figure 3B:
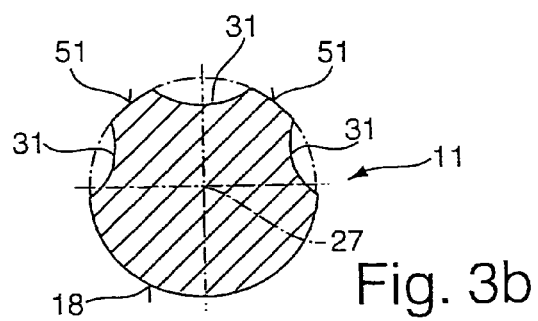

FIG. 3b represents an alternative cross-sectional shape of the bearing, differing from FIG. 3a. For example, instead of only one supporting surface 51, as in FIG. 3a, two supporting surfaces 51 are provided. Alternatively, a plurality of supporting surfaces 51 may be provided. These supporting surfaces 51 are preferably equally arranged about the peripheral portion that is not encompassed by the running face 18. In the exemplary embodiment according to FIG. 3b, the running face 18 has a peripheral angle of less than 180°. The latter may, by analogy with FIG. 3a, be also equal to or greater than 180°. The size, depth and shape of the depressions 31 is variable and may be adapted to meet different requirements. In an embodiment of this type, a depression may equally reach to the axis of rotation 27, or may even be such that the axis of rotation 27 is cut free.

The depressions which are formed according to FIG. 3a between the supporting surface 51 and the running surface 18 may also differ from one another in their shape and in their geometry. The same is true, by analogy, of the depressions provided between the supporting surfaces 51. The geometry of the depressions at the same time allows to exert an influence on the unbalance and on the mass acting within the bearing.

Figure 2:
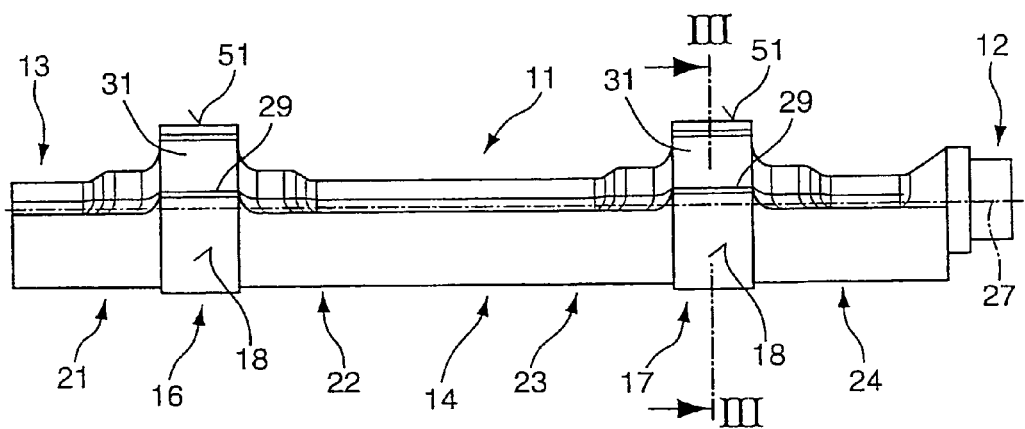
FIG. 2 is a schematic side view of the balancing shaft according to FIG. 1.

In the balancing shaft 11 illustrated in FIGS. 1 to 3, the bearings 16 and 17 are configured to form a sliding bearing. These bearings 16 and 17 can also be configured to form a rolling bearing in the engine unit. The bearings on the engine unit can for example comprise cylindrical rollers or rollers having a needle bush. The cross-sectional surface illustrated in FIG. 3, with the end regions 29 standing laterally upward to form the running face 18, has the advantage that at the same time the lubricating liquid is swirled and lubrication of the bearing 16, 17 is ensured.

The balancing shaft illustrated in FIGS. 1 to 3 compensates in particular for mass forces which generate a static unbalance, such as occur for example in four-cylinder in-line engines. This can compensate for a static unbalance acting for example in a Y axis lying perpendicular to the Z axis, the X axis forming the longitudinal axis of the balancing shaft 11. Alternatively, balancing shafts 11 of this type may also be adapted, and designed, for mounting in single-cylinder engines.

Figure 4:
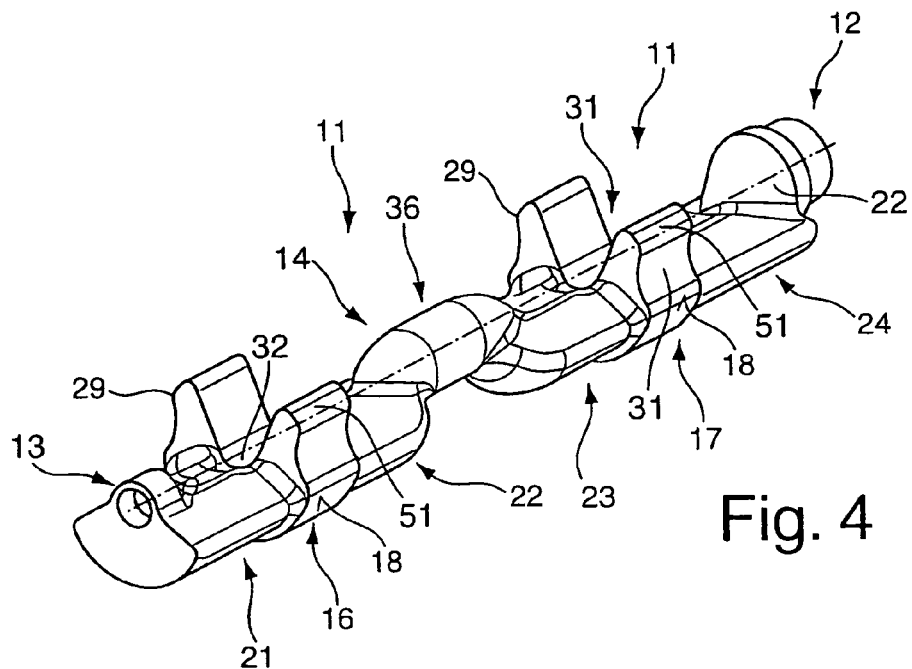
FIG. 4 is a perspective view of a second embodiment according to the invention of a balancing shaft.
Figure 5:
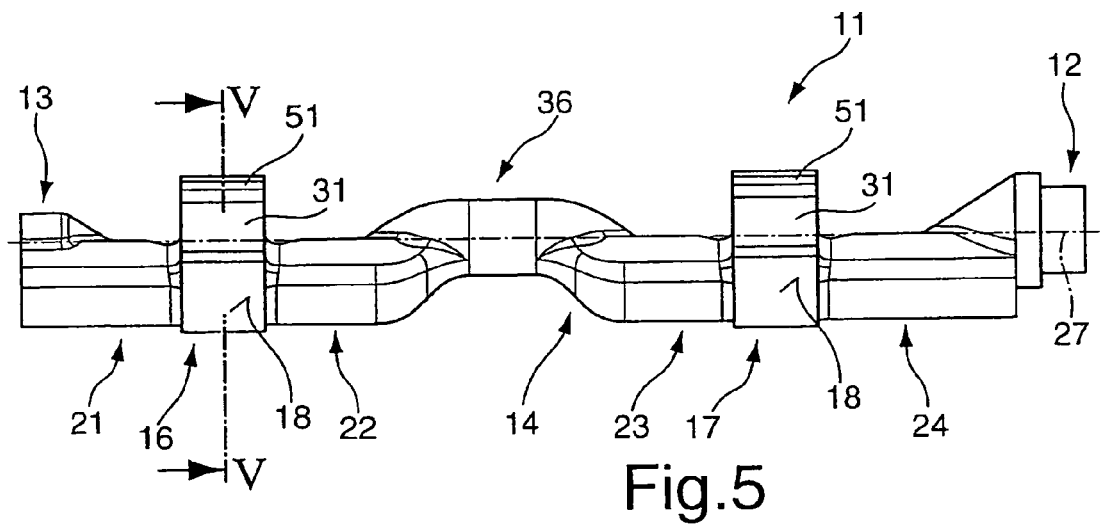
FIG. 5 is a schematic side view of the balancing shaft according to FIG. 4.
Figure 6:
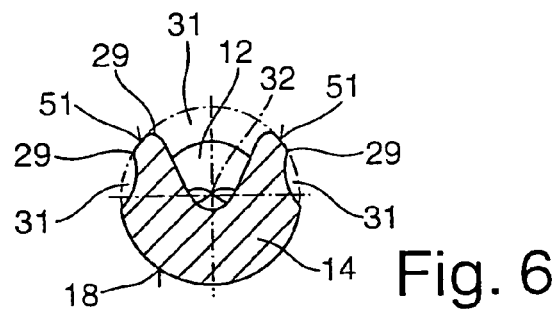
FIG. 6 is a schematic sectional view along the line V-V in FIG. 5.

FIGS. 4 to 6 illustrate a further alternative embodiment of a balancing shaft 11 to FIG. 1. In this balancing shaft 11, the basic element 14 is modified and, as illustrated in FIG. 6, the bearing 16, 17 configured differently from FIGS. 3a and b.

The bearing 16, 17 comprises a depression 31 which is for example tub-like in its configuration, a central wall portion 32 forming, together with the depression 31 and the running face 18 extending partially over the periphery of the bearing 16, 17, a cross-sectional surface lying outside the axis of rotation 27. In an embodiment of this type, the weight of the bearing 16, 17 is reduced still further relative to the embodiment in FIG. 3. The reduction associated therewith is compensated for as a result of the fact that by comparison less mass, which is at a greater distance from the axis of rotation, is provided at one or more points. This principle allows further reduction of the total mass. Provision is in this case preferably made for seamless transitions to be provided from the end portions 12, 13 in each case to the central wall portion 32 of the bearing 16, 17. Such seamless transitions are also provided to the center of the balancing shaft 11 which comprises a rest action portion 36. During the manufacture of a balancing shaft 11 of this type, which is rotatably mounted between tips on the end portions 12 and 13, a holding device or rest additionally acts on the rest action portion 36 in order to allow precise configuration of the running face 18 during machining of the balancing shaft.

A balancing shaft 11 illustrated in FIGS. 4 to 6 is designed for a maximum lightweight construction. By forming supporting surfaces 51, the running behaviour has been improved. Depending on the geometry of the depression 31 on the outer periphery of the bearing 16, 17, the supporting surfaces 51 may be adapted. Different geometries may thus be provided for the cross-sectional areas in order to form a running face 18, on the one hand, and to provide at least one supporting surface 51, on the other, so as to connect these together with a sufficient degree of rigidity. For example, the supporting surface 51 may have a ring-shaped portion oriented radially toward the opposing supporting surface 51 in order to increase the supporting.

Depending on the materials used, a required minimum degree of rigidity and bending strength can be achieved in the longitudinal direction of the balancing shaft 11. The unbalanced weight portions 21, 22 and also 23 and 24 are arranged symmetrically to the bearing 16, 17, wherein in each case their further course of the basic element 14, such as for example that of the end portions 12, 13 and that of the rest action portion 36, influences the design of the mass of the unbalanced weight portions 21, 22, 23, 24. The segment of a circle-shaped cross section of the unbalanced weight portions 21, 22, 23, 24 has the advantage of allowing the unbalanced weight to be positioned eccentrically well outside the axis of rotation 27.

In the embodiments described hereinbefore, the depression 31 may form, together with the running face 18 and the at least one supporting surface 51 or between the supporting surfaces 51, a turbine wheel-like cross section or an asymmetric cross-section.

The configuration of the depression 31 is adapted, in the shape, size and/or geometry thereof, to the respective application, wherein a large number of possible configurations can be provided.

Figure 7:
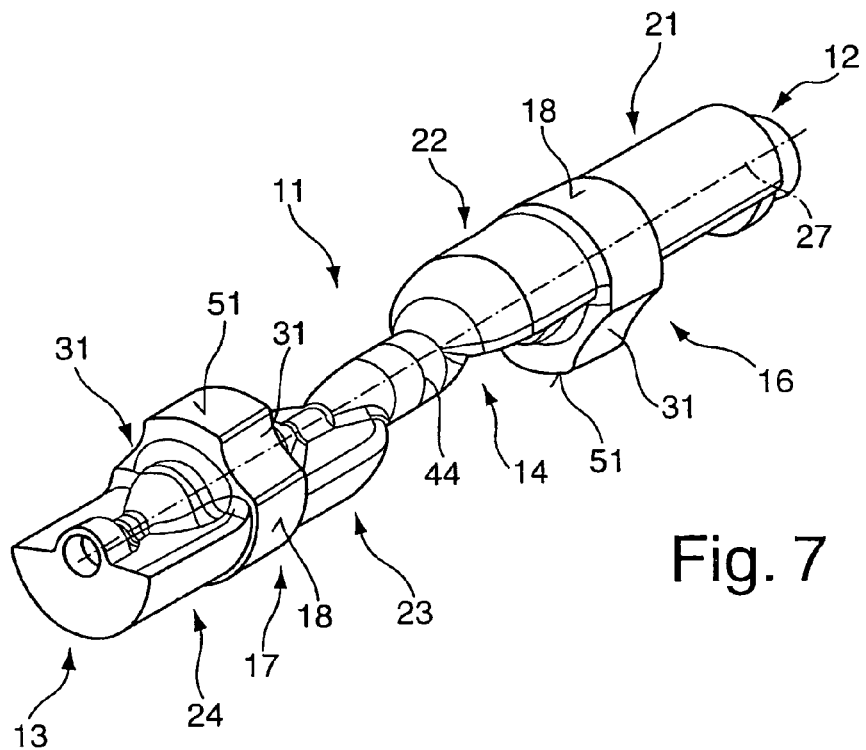
FIG. 7 is a perspective view of a third embodiment according to the invention of a balancing shaft.
Figure 8:
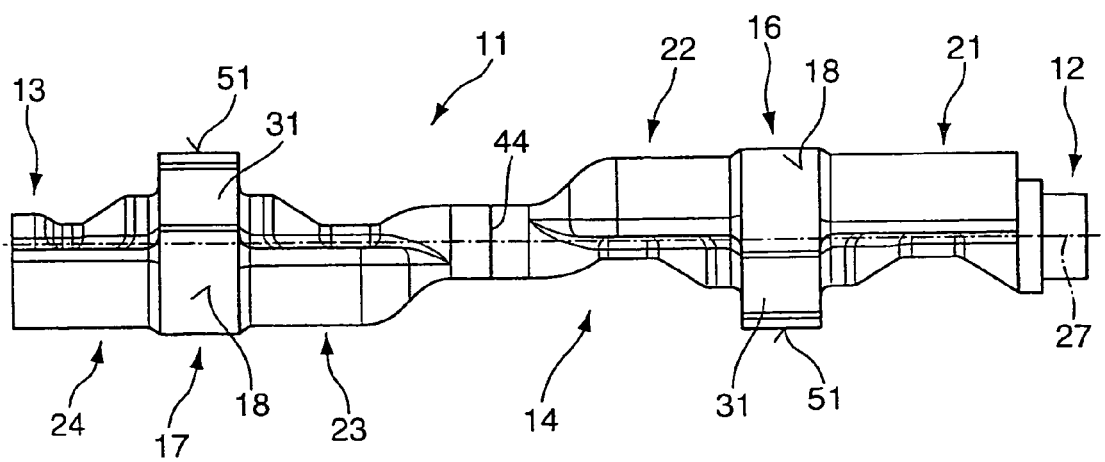
FIG. 8 is a schematic side view of the balancing shaft according to FIG. 7.

FIGS. 7 and 8 illustrate a further alternative embodiment of a balancing shaft 11. This balancing shaft 11 differs from that of the preceding Figures in that the unbalanced weight portions 21, 22, 23, 24 and the bearings 16, 17 are configured substantially point-symmetrically to the center plane 44. The center plane 44 lies perpendicular to the X axis or axis of rotation or longitudinal axis of the balancing shaft 11. A balancing shaft 11 of this type is used, in contrast to the foregoing balancing shafts 11 according to FIGS. 1 to 6, to compensate for unbalances of moments. Such compensating for unbalances of moment is provided in engines having for example a V-shaped cylinder arrangement, such as in V3 or V6 engines or in-line engines having an odd number of cylinders.

Figure 9:
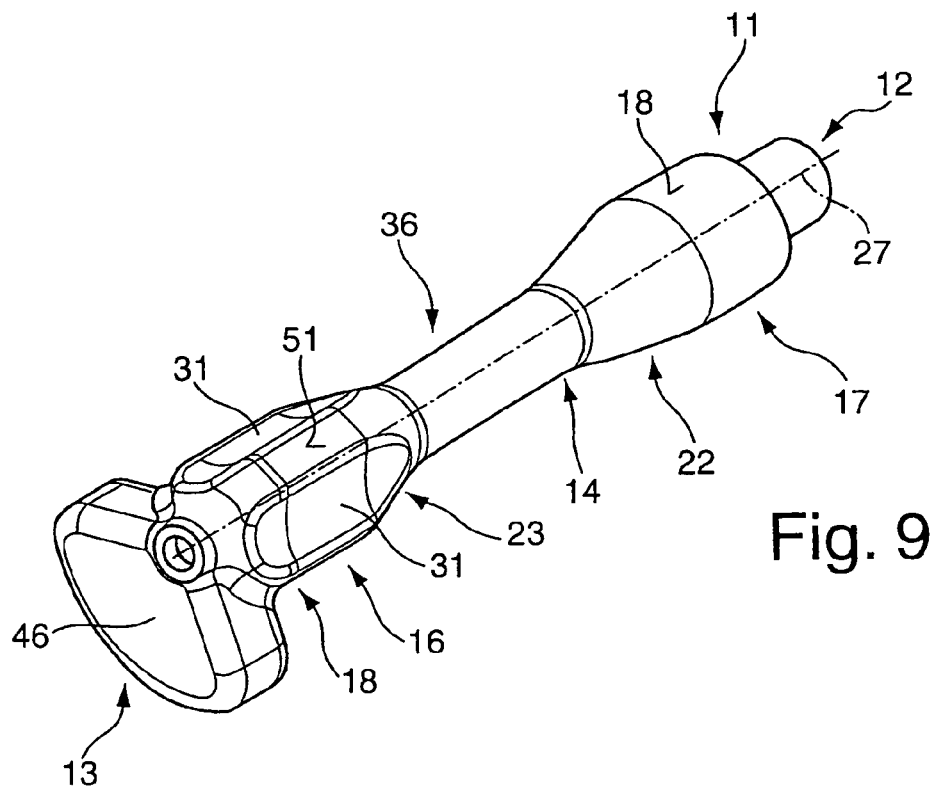
FIG. 9 is a perspective view of a forth embodiment according to the invention of a balancing shaft.
Figure 10:
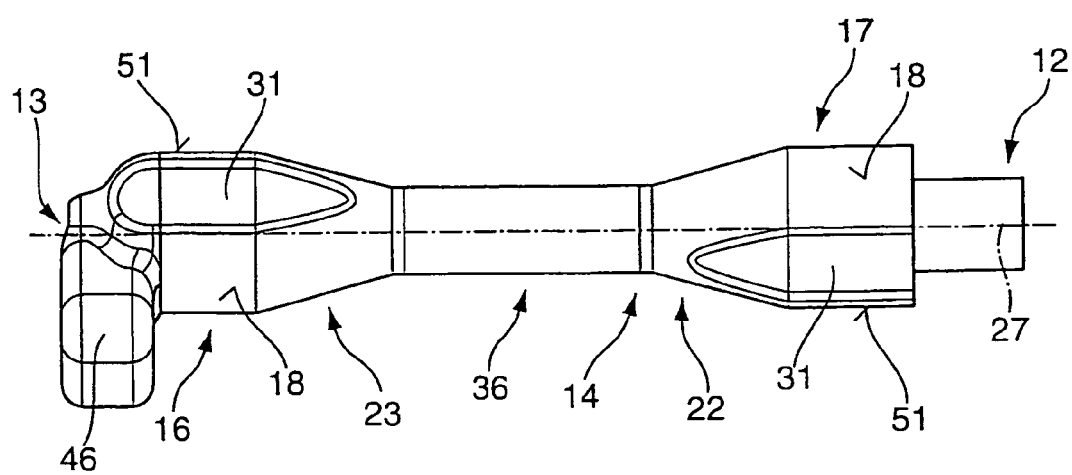
FIG. 10 is a schematic side view of the balancing shaft according to FIG. 9.

FIGS. 9 and 10 represent a further alternative embodiment of a balancing shaft 11. This embodiment is an alternative to the balancing shaft 11 according to FIGS. 7 and 8. In this embodiment, an unbalanced weight portion 46, which has at least in certain portions an outer periphery which is larger in diameter than the diameter of the running face 18, is provided at one end of the balancing shaft 11. This unbalanced weight portion 46 is configured as a disk-like unbalanced mass or as a partial segment of a disk-like unbalanced mass. The arrangement of an unbalanced mass of this type at an outer end of the balancing shaft 11 has the advantage of preserving simple mounting of the balancing shaft 11. In other respects, that which was stated with regard to the foregoing figures applies. The unbalanced weight portion 46 can be configured in addition to or comprise the unbalanced weight portions 21, 24 lying at the outer end.

In the exemplary embodiments mentioned hereinbefore, oil may be supplied to the balancing shaft 11 by means of an axial bore from which at least one radial bore branches off, leading to the bearing 16, 17. For example, the radial branch bore may be associated with the running face 18 or lead to the running face 18 close to an end region 29. The same may be true, by analogy, of the supporting surface 51. The radial bore may also lead to a depression 31. The radial orientation and the number of radial bores are dependent on the required amount of lubricant supply.

Figure 11:
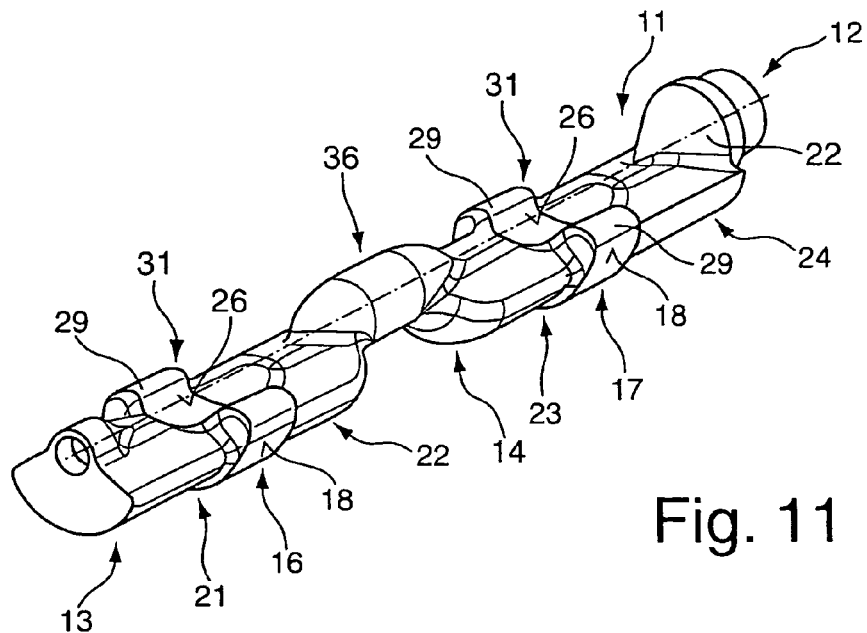
FIG. 11 is a perspective view of a further embodiment according to the invention of a balancing shaft.
Figure 12:
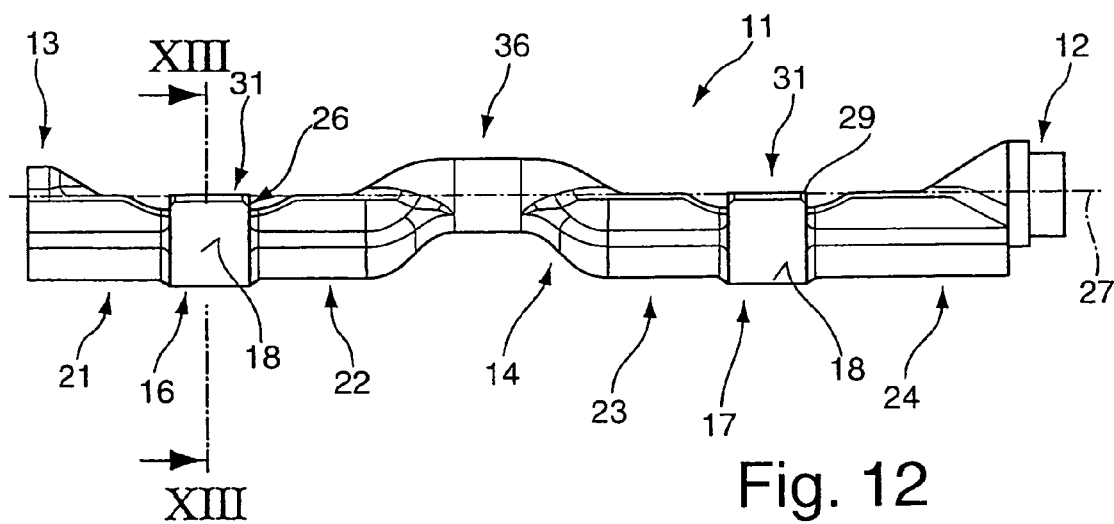
FIG. 12 is a schematic side view of the balancing shaft according to FIG. 11.
Figure 13:
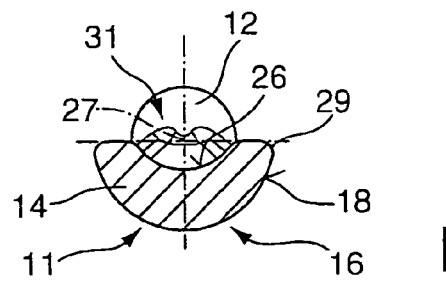
FIG. 13 is a schematic sectional view taken along the line XII-XII in FIG. 12.

FIGS. 11 to 13 represent an alternative embodiment of a balancing shaft 11 according to the invention. This balancing shaft 11 differs from the balancing shaft 11 according to FIGS. 4 to 6 in so far as no supporting surfaces 51 are provided. The running face 18 of the bearing 16, 17 has a peripheral angle of less than 180°. Between the end regions 29 of the running face, a depression 31 is provided which is for example shaped in the form of a tub and the central wall portion 32 of which lies outside the axis of rotation 27, such that the axis of rotation 27 is cut free. In an embodiment of this type, the weight of the bearing 16, 17 is further reduced. The reduction in unbalanced weight associated therewith is compensated for as a result of the fact that by comparison less mass, which is at a greater distance from the axis of rotation 27, is provided at one or more points. This principle allows further reduction of the overall mass. Provision is in this case preferably made for seamless transitions to be provided from the end portions 12, 13 in each case to the central portion 32 of the bearings 16, 17. Such seamless transitions are also provided to the center of the balancing shaft 11 which comprises a rest action portion 36. During the manufacture of balancing shafts of this type, which are rotatably mounted between tips on the end portions 12 and 13, a holding device or rest additionally acts on the rest action portion 36 in order to allow precise machining. Moreover, the features described above in connection with the individual embodiments may equally be provided for the present balancing shaft according to FIGS. 11 to 13, unless they refer to the supporting surfaces 51 as such or to a peripheral angle of the running face 18 of the bearings 16, 17 as such.

The balancing shafts 11 described hereinbefore can also be combined with one another in any desired manner in an engine. This is dependent on the construction of the engine, so that the design of the balancing shaft or the balancing shafts must be adapted to the static unbalance and/or unbalance of moments to be compensated for. Likewise, individual features of individual balancing shafts 11 can be combined with one another.

All the exemplary embodiments described hereinbefore have in common the fact that the center of gravity of the balancing shaft 11 comprises, at the latest in the mounted state, a center of gravity in a center of the multi-cylinder engine based on the longitudinal direction thereof.

All the features described hereinbefore are each per se essential to the invention and can be combined with one another in any desired manner.

The invention claimed is:

1. A balancing shaft for a single-cylinder or multi-cylinder engine having at least one unbalanced weight portion and at least one bearing, the at least one unbalanced weight portion being associated with the bearing and the bearing having a radial running face which extends only partially over a periphery of the bearing and a centrifugal force which results during rotation of the balancing shaft is situated within a region of the bearing that is formed by the running face which extends partially over the periphery of the bearing wherein provision is made for at least one supporting surface to extend partially over the periphery of the bearing and to be provided separate from the running surface.

2. The balancing shaft as claimed in claim 1, wherein the at least one supporting surface has the same outer periphery as the partially formed running face of the bearing.

3. The balancing shaft as claimed in claim 1, wherein on rotation of the balancing shaft the centrifugal force acting on the running face is opposed by at least one resultant force from the at least one supporting surface.

4. The balancing shaft as claimed in claim 1, wherein the running face of the at least one bearing has a peripheral angle which is equal to, or smaller than 180° or greater than 180°.

5. The balancing shaft as claimed in claim 1, wherein the running face or the at least one supporting surface is cylindrical in its configuration.

6. The balancing shaft as claimed in claim 1, wherein between the at least one supporting surface and the running face of the bearing a depression is formed.

7. The balancing shaft as claimed in claim 1, wherein the bearing has, viewed in cross section to the longitudinal direction of the balancing shaft, a depression, in particular a V-shaped, shaped, W-shaped, tub-shaped or cup-shaped depression.

8. The balancing shaft as claimed in claim 7, wherein the depression is configured symmetrically to the longitudinal direction of the balancing shaft or the depression forms with the running face of the bearing a turbine wheel-like or an asymmetrical cross section.

9. The balancing shaft as claimed in claim 7, wherein the running face of the bearing and the depression adjoining it form a cross-sectional surface in which the axis of rotation lies within this cross-sectional surface or that the depression has at least one central wall portion which is situated in the axis of rotation of the balancing shaft or that the running face and the at least one supporting surface of the bearing and the depression adjoining it form a cross-sectional surface in which the axis of rotation lies outside this cross-sectional surface.

10. The balancing shaft as claimed in claim 1, wherein the partially configured running face of the bearing extends symmetrically to the resulting centrifugal force during the rotation of the balancing shaft.

11. The balancing shaft as claimed in claim 1, wherein the running-face width of the bearing tapers, at least in certain portions, to end regions of the partially configured running face.

12. The balancing shaft as claimed in claim 1, wherein a peripheral angle of the running face or supporting surface of the first bearing is equal to the peripheral angle of the running face of at least one further bearing.

13. The balancing shaft as claimed in claim 1, wherein the first and at least one further running face or supporting surface of the bearings are of the same orientation, viewed in the longitudinal direction of the axis, with respect to the peripheral angle thereof.

14. The balancing shaft as claimed in claim 1, wherein the first and at least one further running face of the bearings are arranged, viewed in the longitudinal direction of the axis, rotated relative to one another.

15. The balancing shaft as claimed in claim 1, wherein at least one bearing, the running face thereof and an unbalanced weight portion are arranged point-symmetrically to the center plane of the balancing shaft.

16. The balancing shaft as claimed in claim 10, wherein the running faces, which are arranged rotated relative to one another, of the first and at least one further bearing have, viewed in the longitudinal direction of the axis, an overlap region.

17. The balancing shaft as claimed in claim 1, wherein at least one bearing and one fixed bearing are provided.

18. The balancing shaft as claimed in claim 1, wherein at least one unbalanced weight portion is provided, which has at least one outer peripheral portion having a larger diameter than that diameter of the at least one running face of the bearing.

19. The balancing shaft as claimed in claimed 18, wherein the unbalanced weight portion is provided at an outer end of the basic element.

20. A balancing shaft for a single-cylinder or multi-cylinder engine having at least one unbalanced weight portion and at least one bearing, wherein the at least one unbalanced weight portion is associated with the bearing and the bearing has a radial running face which extends only partially over a periphery of the bearing, and a centrifugal force which results during rotation of the balancing shaft is situated within a region of the bearing that is formed by the running face which extends partially over the periphery of the bearing, wherein the partial running face of the bearing has a peripheral angle of less than 180°.

* * * * *